United States Patent [19]
Thompson et al.

[11] Patent Number: 5,154,254
[45] Date of Patent: Oct. 13, 1992

[54] MASS RETRIEVAL FOR ACOUSTIC PULSE GENERATOR

[75] Inventors: David D. Thompson; Tom P. Airhart; Andrew B. Woodrow, all of Plano; Gary M. Karner, Garland, all of Tex.

[73] Assignee: Atlantic Richfield Company, Los Angeles, Calif.

[21] Appl. No.: 510,352

[22] Filed: Apr. 16, 1990

[51] Int. Cl.⁵ .............................................. G01V 1/04
[52] U.S. Cl. .................................. 181/121; 181/114; 367/189
[58] Field of Search ................ 367/189, 190; 181/113, 181/114, 119, 121, 401

[56] References Cited

U.S. PATENT DOCUMENTS

| | | | |
|---|---|---|---|
| 3,439,773 | 4/1969 | Dart et al. | 181/117 |
| 4,284,164 | 8/1981 | Airhart | 181/117 |
| 4,284,165 | 8/1981 | Airhart et al. | 181/119 |
| 4,700,804 | 10/1987 | Trudeau | 181/121 |

FOREIGN PATENT DOCUMENTS 612569 4/1935 Fed. Rep. of Germany.

Primary Examiner—Charles T. Jordan
Assistant Examiner—J. Woodrow Eldred

[57] ABSTRACT

A method and an apparatus for mass retrieval for an acoustic pulse generator are disclosed herein. In an impulse type seismic generating apparatus an air spring, mechanical spring, controlled pressurization of an air spring or other energy storage medium is employed to use potential energy to raise the impact mass to a resting position above an earth contacting baseplate as quickly as possible after the impact mass strikes the baseplate.

20 Claims, 6 Drawing Sheets

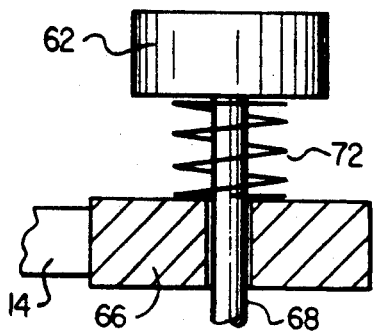
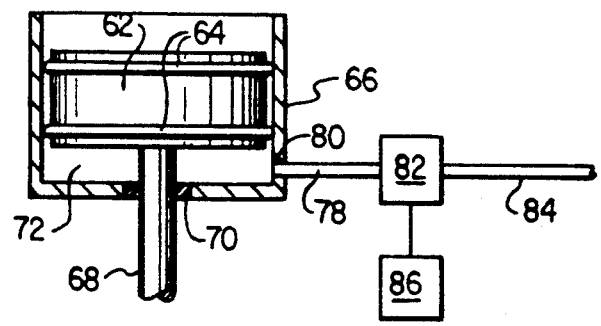
FIG. 6  FIG. 7
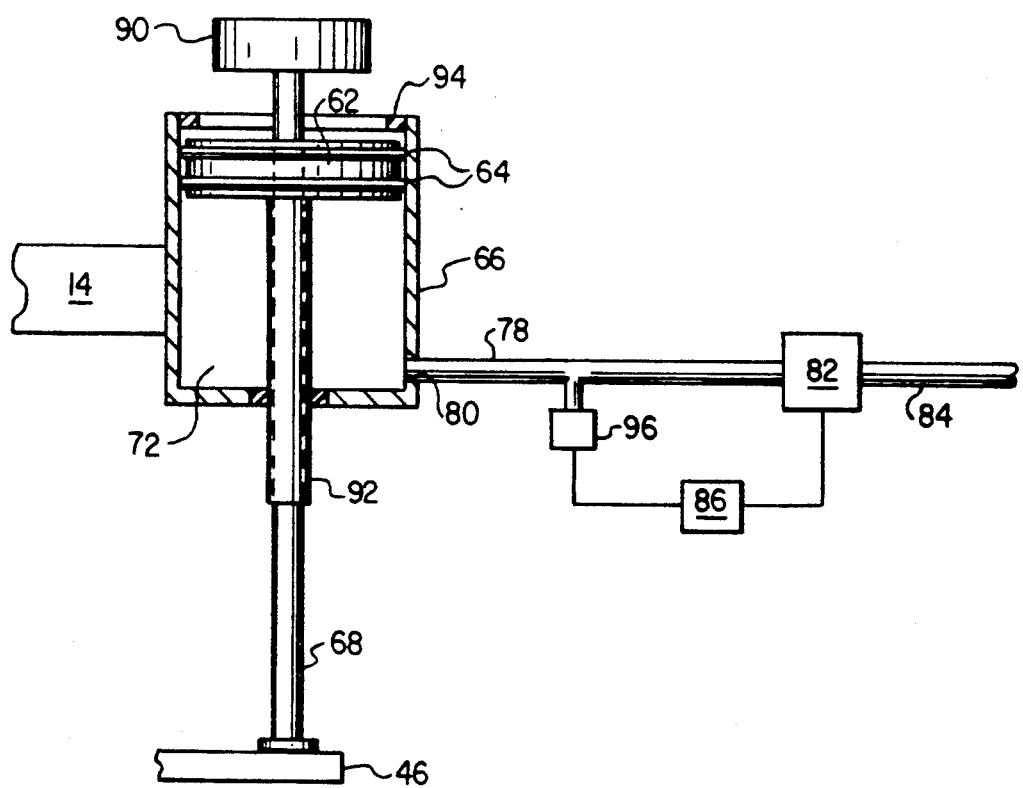
FIG. 9

MASS RETRIEVAL FOR ACOUSTIC PULSE GENERATOR

BACKGROUND OF THE INVENTION

I. Field of the Invention

This invention relates generally to the field of seismic prospecting and more particularly to a method and apparatus for injecting an acoustic pulse into the earth by means of a repetitively cycled impact mass.

II. Description of the Prior Art

U.S. Pat. No. 4,284,165, issued Aug. 18, 1981 to Tom P. Airhart, et al, entitled "Acoustic Pulse Generator" describes an apparatus for generating an acoustic pulse in the earth including an impact piston which is driven downwardly by compressed gas to strike a baseplate positioned on the earth's surface. The kinetic energy of the impact piston is transformed into elastic-wave energy at the time that the piston strikes the baseplate and that elastic-wave energy pulse is transmitted into the earth for purposes of seismic prospecting. Seismic prospecting utilizes reflections of this elastic wave from the various strata beneath the surface of the earth as is well known in the art. In preparation for the next pulse generation, the impact piston is lifted from the baseplate and latched in a position- some distance above it. This process can be repeated until such time as the desired seismic processing is completed.

While using the above-described apparatus for seismic prospecting, additional undesired noise in the frequency range of interest was detected which was apparently due to the retrieval of the impact piston. This undesired noise is generated by the lift rods contacting a flange attached to the impact piston and, by the relaxation of the stress on the earth-contacting baseplate, during the brief time that the load is being removed from the center of the baseplate. Attempts to eliminate this noise through the use of springs and hydraulic fluid accumulators have not generally been sufficient to permit retrieval during recording. Furthermore, attempts at filtering the noise out of the received signals have been unsuccessful. Received reflected elastic-wave signals are significantly attenuated during their transit time and must be processed in order to remove undesired noise. The filtering of this undesired noise is best accomplished when the noise itself is coherent in nature, repeatable, and occurs early in the recording cycle. The prior art method of retrieval did not provide a coherent and repeatable noise.

Therefore, impact piston retrieval has been delayed until after all desired reflected signals have been received and recorded. This is typically between six and ten seconds. In addition, the time required to retrieve the mass is about eight seconds. Therefore, current total cycle time is between fourteen and eighteen seconds resulting in reduced efficiency due to longer wait periods between impact and retrieval. If the mass could be retrieved during the recording time, the cycle time could be reduced to eight to ten seconds and efficiency nearly doubled.

Therefore, the need exists for a mass retrieval method and apparatus for an elastic pulse generator that can reliably, repetitively remove the impact piston from the baseplate as early after the impact as possible.

SUMMARY OF THE INVENTION

The present invention comprises an impulse type seismic generating apparatus having a plurality of energy receivers affixed to a horizontal frame and adapted to engage a plurality of energy transmitters through an energy storage medium prior to impact of a impact mass on a baseplate so as to exert a lift force upon the impact mass. The energy storage medium can be an air spring or a mechanical spring. The present invention also comprises an impulsive seismic energy generating method wherein a portion of the kinetic energy of an impact mass is converted to potential energy just prior to impact and the impact mass is raised off a baseplate using the stored potential energy. The present invention also comprises an impulsive seismic energy generating method wherein the impact mass is raised off an earth contacting baseplate as quickly as possible after impact. The present invention, therefore, solves the problems related to a mass retrieval for an acoustic pulse generator. It provides reliable and repetitive removal of the impact piston from the baseplate as early as possible after impact and thereby provides the advantage of nearly doubling the number of cycles that can be performed in a fixed period of time.

BRIEF DESCRIPTION OF THE DRAWING

FIG. 6 is a detailed vertical section showing the construction of the energy storage portion of the mass retrieval system in accordance with useful alternate embodiment.

FIG. 7 is a detailed vertical section showing the construction of the energy storage portion of the mass retrieval system in accordance with a second useful alternate embodiment of the invention.

FIG. 9 is a detailed vertical section showing the construction of the energy storage portion of the mass retrieval system in accordance with a fourth useful alternate embodiment of this invention.

DETAILED DESCRIPTION OF THE PREFERRED EMBODIMENT

Figure 1:
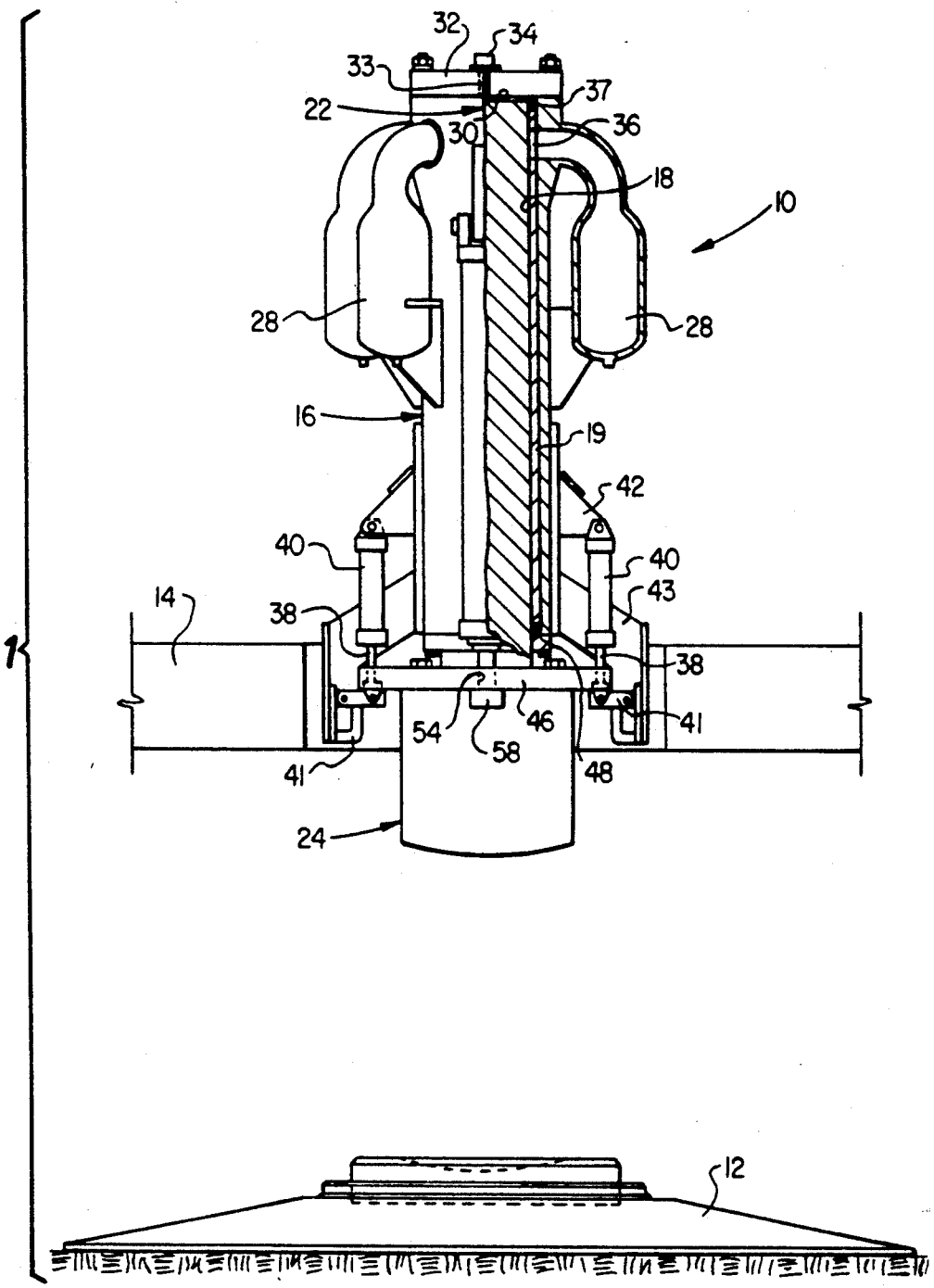
FIG. 1 is a simplified elevational view of the apparatus of this invention partially sectioned showing an impact mass suspended above an earth-contacting baseplate preparatory to firing.

Referring to FIG. 1, which is a simplified elevational view of the apparatus of this invention partially sectioned showing an impact mass suspended above an earth-contacting baseplate preparatory to firing, there is illustrated a seismic source comprising actuator 10 supported above baseplate 12 in any suitable manner on horizontally extending frame 14 of a transport vehicle (not shown). Actuator 10 is an impact-type seismic device which utilizes high-pressure air to accelerate a mass to a target as generally described in U.S. Pat. No. 4,284,165 issued Aug. 18, 1981 to Tom P. Airhart and entitled "Acoustic Pulse Generator" which is hereby incorporated by reference. Actuator 10 consists generally of a hollow, upstanding cylindrical housing 16 having a bore 18 lined with bronze bushing 19 which receives the upper end of an impact piston 22, the lower end of impact piston 22 enlarges in diameter which forms an impact mass 24. The operation of the actuator 10 causes mass 24 to be propelled rapidly downward by pressure provided from a plurality of pressure vessels 28 so as to strike baseplate 12 which couples almost all of the kinetic energy of mass 24 into the earth generating a seismic elastic wave.

FIG. 1 shows piston 22 latched in its uppermost or "top" position in which its top surface 30 is closely adjacent to the closed upper end 32 of housing 16. Any air trapped between end 32 and surface 30 can be vented to atmosphere through passage 33 by operation of valve 34. In this position, the sidewalls of piston 22 block ports 36 communicating between the interior of bore 18 and pressure vessels 28. Hermetic seal 37 recessed within bushing 19 at the top of bore 18 prevents high-pressure air from leaking above piston 22.

The respective ends of piston rods 38 of a pair of trigger cylinders 40 supported on opposite sides of housing 16 are connected to a pair of hinged latches 41 which project beneath and support flange 46 of mass 24 in top position of piston 22. Cylinders 40 and latches 41 are fixed to housing 16 respectively by mounting brackets 42 and 43.

Figure 2:
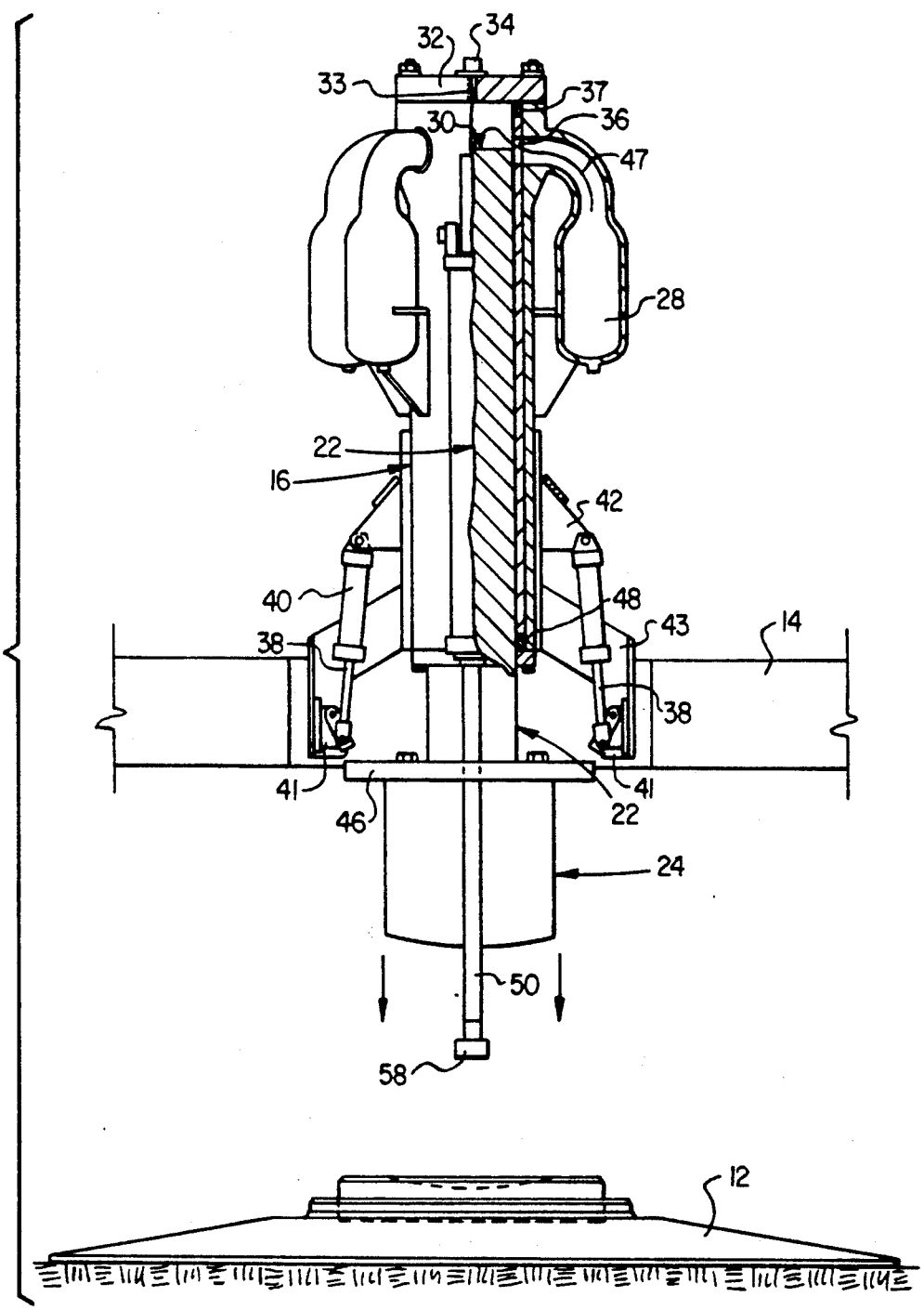
FIG. 2 is a further elevational view of the apparatus of FIG. 1 partially sectioned wherein the masses in transit to the baseplate and the piston rods of the hydraulic lift cylinders are in a downwardly extended position.

FIG. 2 is a further elevational view of the apparatus of FIG. 1 partially sectioned wherein the masses in transit to the baseplate and the piston rods of the hydraulic lift cylinders are in a downwardly extended position. The operation can best be described by referring to FIG. 2. When a firing signal activates trigger cylinders 40, their piston rods extend and in so doing swing hinged latches 41 away from under flange 46 as best seen in FIG. 2. As mass 24 drops under the force of gravity, high-pressure air, typically on the order of 300 psi, enters bore 18 along path 47 through ports 36 and is exposed to the top surface 30 of piston 22. This provides a powerful downward force across the entire cross sectional area of top surface 30 which aids gravity so as to drive piston 22 and thus propel mass 24 into baseplate 12 with great force. Hermetic seal 48 recessed within bushing 19 adjacent the lower of end of bore 18 prevents air from exiting downward from bore 18 and thus ensures that actuator 10 operates as a closed-air system. In other words, air is continuously cycled back and forth between pressure vessels 28 and bore 18 with repeated firings.

Figure 3:
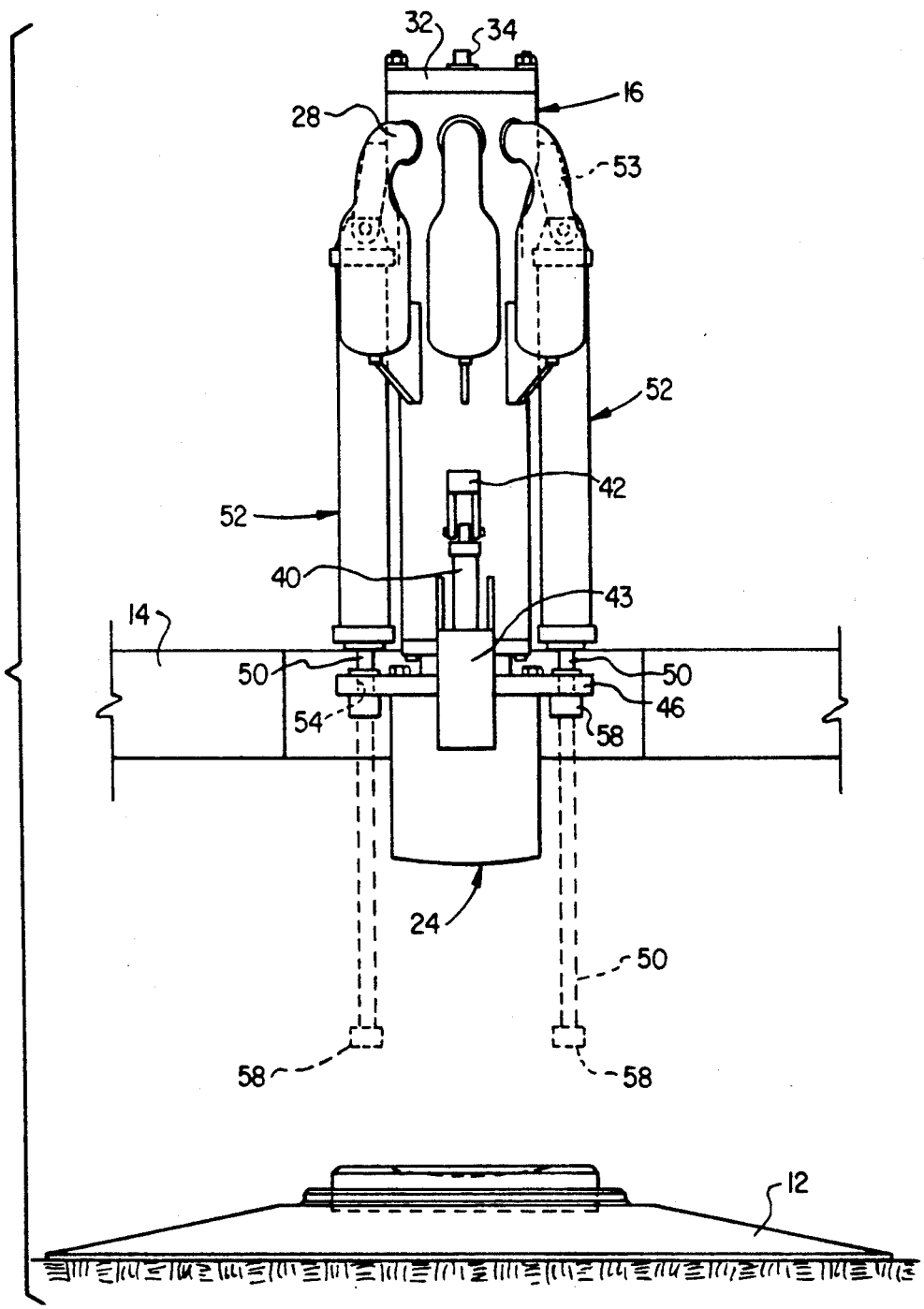
FIG. 3 is a further elevation view of the apparatus of FIG. 1 rotated through an angle of 90 to illustrate the manner in which dual hydraulic lift cylinders engage opposite sides of the mass.

As is best seen in FIG. 3, which is a further elevation view of the apparatus of FIG. 1 rotated through an angle of 90° to illustrate the manner in which dual hydraulic lift cylinders engage opposite sides of the mass, the piston rods of hydraulic cylinders 52 affixed to opposite sides of housing 16 by brackets 53 project slidably through vertical apertures 54 penetrating flange and terminate in cylindrical lift caps 58. Preparatory to operation of actuator 10, rods 50 are lowered to assume the dotted position shown. Mass 24 necessarily slides downwardly on rods 50 as actuator 10 is fired. When mass 24 has impacted baseplate 12, the underside of flange 46 is positioned slightly above caps 58. Upon completion of a firing operation, cylinders 52 are actuated to retract piston rods 50 thereby causing caps 58 to engage the under surface of flange 46 and lift mass 24 toward its original latch position of FIG. 1. At the same time, pressure vessels 28 are being repressurized to substantially their original pressure. Hydraulic cylinders 52 are designed to "bottom out" just as the top surface 30 of piston 22 overlaps top seal 37.

In the operation described, unwanted shock results from the impact of caps 58 against flange 46 and by reason of the fact that the baseplate 12 is suddenly relieved of the weight of the mass 24, which typically is on the order of 5,000 pounds. While the exact nature of the resultant secondary seismic wave is still being analyzed, it appears to be due, at least in part, to a sudden shifting of elastic strain in the earth.

Figure 4:
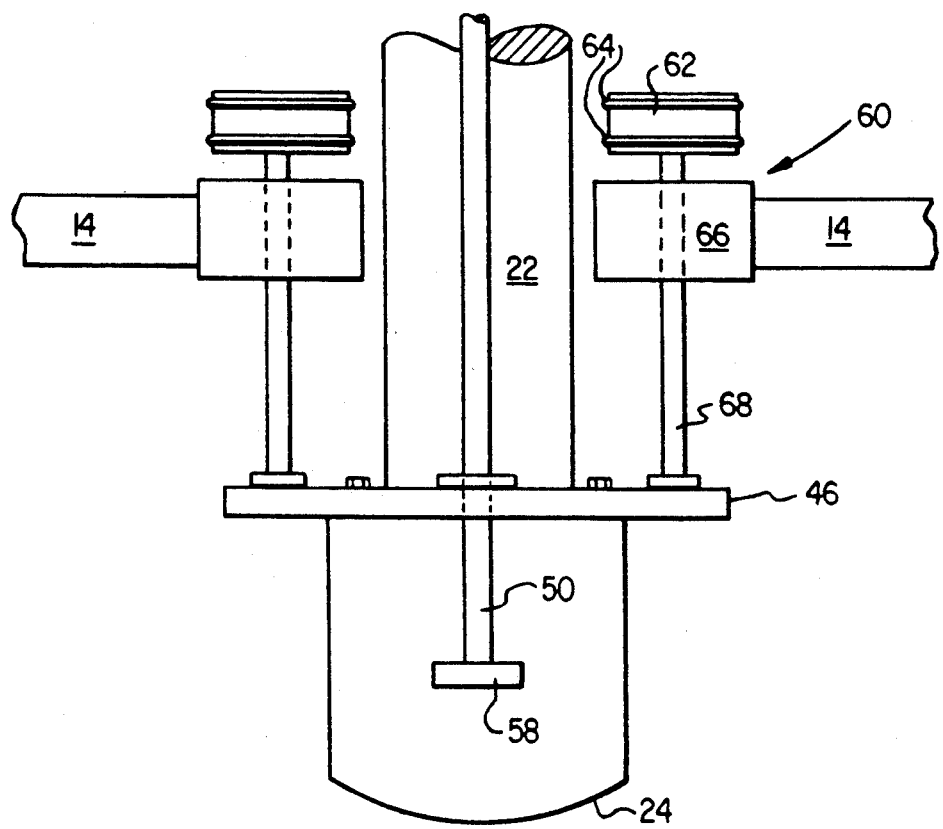
FIG. 4 is a detailed elevational view showing the mass of the apparatus in transit to the baseplate and showing the energy storage portion of the mass retrieval system.

FIG. 4 is a detailed elevational view showing the mass of the apparatus in transit to the baseplate and showing the energy storage portion of the mass retrieval system.

In order to reduce the unwanted elastic shock in a useful embodiment, support flange 46 of mass 24 is attached to an energy transfer assembly 60 (e.g. an air spring) via rod 68 as shown in FIG. 4. Energy transfer assembly 60 includes an energy receiver 66 which is attached to a horizontally-extending frame 14 of a transport vehicle (not shown). Energy transmitter 62, sized to fit within energy receiver 66 is attached to support flange 46 via rod 68. In addition, hermetic seals 64 seal against the inner wall of energy receiver 66.

FIG. 5 is a further detailed elevational view showing the energy storage portion of the mass retrieval system shown in FIG. 4 where the mass is in transit, impacting the baseplate, and at rest above the baseplate.

Figure 5A:
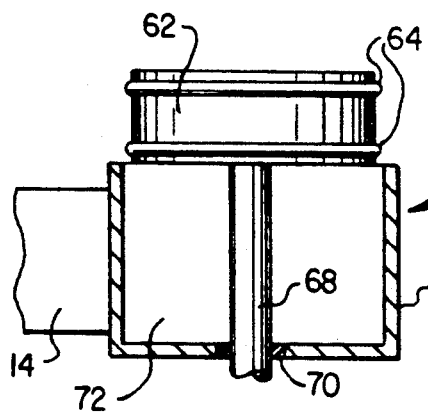
FIG. 5a, 5b and 5c further detailed elevational views showing the energy storage portion of the mass retrieval system shown in FIG. 4 where the mass is in transit, impacting the base the baseplate, respectively, and at rest above the baseplate.
Figure 5B:
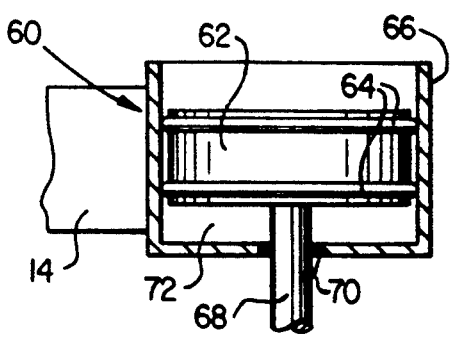
Figure 5C:
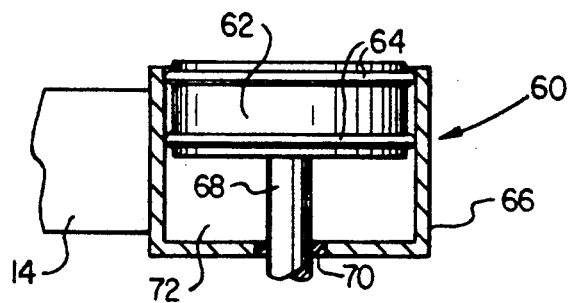

FIG. 5(A)–(C) shows a cut-away view of energy transfer assembly 60 and shows the hermetic seals 70 which are attached to energy receiver 66 and seal the opening through energy receiver 66 through which rod 68 passes. The operation of energy transfer assembly 60 in conjunction with the support flange 46 (shown in FIG. 4), impact mass 24 (FIG. 4) and baseplate 12 (FIG. 3) can be explained with reference to FIG. 5. In FIG. 5(A), the impact mass 24 (FIG. 4) in its support flange 46 (FIG. 3) are moving downward toward baseplate 12 (FIG. 3). Energy transmitter 62, which is attached to support plate 46 (FIG. 4) via rod 68, is also moving downward and as it enters, the top of energy receiver 66 will form an energy storage medium of compressed air 72 (e.g., a cushioning volume). As energy transmitter 62 continues its downward motion, energy storage medium (e.g., cushioning volume of air) 72 is compressed by the action of an energy transmitter 62, energy receiver 66 and hermetic seals 64 and 70. The compression of energy storage medium 72, due in part to the momentum of impact mass 24, continues until impact mass 24 strikes baseplate 12 (FIG. 3) thereby exhausting the kinetic energy of impact mass 24. Since impact mass 24 no longer has any momentum, and since the compression of energy storage medium 72 as shown in FIG. 5(B) generates potential energy, energy storage medium 72 releases a portion of its potential energy by expanding, as shown in FIG. 5(C) and achieves an equilibrium, resting position, holding the impact mass 24 and support flange 46 at a point slightly above baseplate 12 (FIG. 3). Baseplate 12 is suddenly relieved of the weight of the impact mass 24. The removal of impact mass 24 from the baseplate 12 in this manner generates a repeatable seismic wave.

There are three aspects of this invention that make it effective at minimizing the deleterious effects of mass retrieval that can occur during seismic data recording for rapid operation:

1) Noise from this method of mass retrieval occurs at a time when reflection signals have relatively high amplitude. Thus, the signal-to-noise ratio is high. This is because the retrieval occurs immediately after impact. Any reflections arriving at the same time as the retrieval noise must be shallow and, thus, have undergone very little spreading loss. It is possible that the retrieval noise would occur so early in the record that it would only interfere with other source-generated surface-wave noise.

2) Retrieval by this method can be made to be relatively repeatable and to occur so soon after impact that whatever elastic energy the retrieval generates becomes a consistent short-duration extension to the main seismic pulse. In this way also, the impact of the unwanted elastic shock from the impact of caps 58 against flange 56 can also be minimized. This permits ordinary pulse-compression data processing, called deconvolution, to reduce whatever effect retrieval has on the reflection data.

3) Retrieval by this method can be designed to be aided by and to occur at the same time as the impact mass rebounds off of the base-plate, an action which happens whether or not the mass is retrieved. Mass retrieval at this time may produce little or no additional effect on the signal in the first place.

FIG. 6 is a detailed vertical section showing the construction of the energy storage portion of the mass retrieval system in accordance with useful alternate embodiment. Rod 68, connected to impact mass 24 through support flange 46 as shown in FIG. 4, is attached to energy transmitter 62. Rod 68 passes through an energy receiver 66 which is attached to a horizontally-extending frame 14 of transport vehicle (not shown). An energy storage medium 72 is attached to the underside of energy transmitter 62 and energy storage medium 72 will be compressed between energy transmitter 62 and energy receiver 66 as impact mass 24 and support flange 46 move downward. As energy storage medium 72 is compressed between energy transmitter 62 and energy receiver 66, it stores potential energy. The particular characteristics of energy storage medium 72 are established using well-known spring principles such that the resting position of impact mass 24 and support flange 46 is a small distance above baseplate 12 (FIG. 3). Therefore, impact mass 24 is lifted from baseplate 12 immediately following the impact and any resulting secondary seismic wave is repeatably produced early in the receiving portion of the cycle.

FIG. 7 is a detailed vertical section showing the construction of the energy storage portion of the mass retrieval system in accordance with a second useful alternate embodiment of the invention. In this embodiment, pipe 78 connected between orifice 80 and energy receiver 66 and valve 82 allows desired pressurization or venting of energy storage medium 72 through inlet 84. Inlet 84 may be connected to either a vent or a source of compressed gas (not shown). Controller 86 adjusts the timing and stroke of valve 82.

In operation, reducing the pressure in energy storage medium 72 just prior to impact will reduce the amount of energy absorbed by air spring during the downward motion of impact mass 24 thereby allowing, for example, a greater impact velocity. In addition, by allowing, for example, rapid pressurization immediately following impact, impact mass 24 can be raised to an equilibrium position above baseplate 12 (FIG. 3) while minimizing the reduction in impact mass velocity prior to striking the baseplate.

Figure 8A:
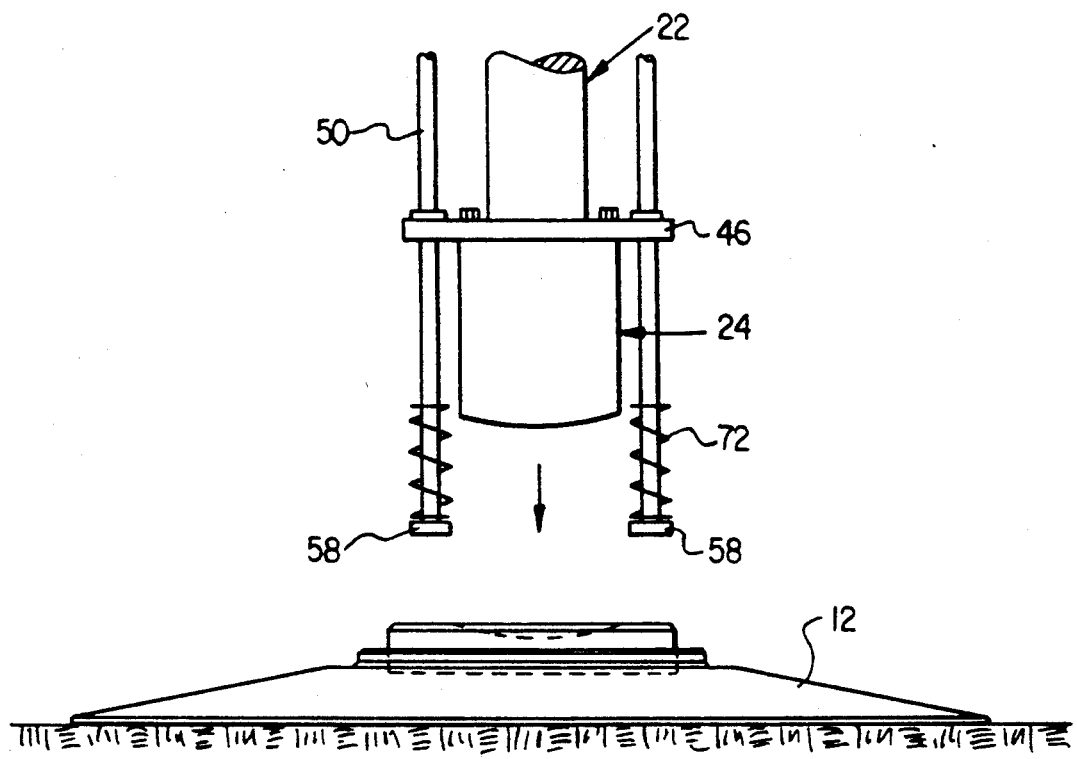
FIG. 8a and 8b are a detailed vertical section showing the construction of the energy storage portion of the mass retrieval system in accordance with a third useful alternate embodiment of this invention.

Referring now to FIG. 8, which is a detailed vertical section showing the construction of the energy storage portion of the mass retrieval system in accordance with a third useful alternate embodiment of this invention. In this embodiment, energy storage medium 72 is compressed between support flange 46 (i.e. an energy transmitter) and lift caps 58 (i.e. an energy receiver) which are attached to piston rods 50 which pass through support flange 46.

Figure 8B:
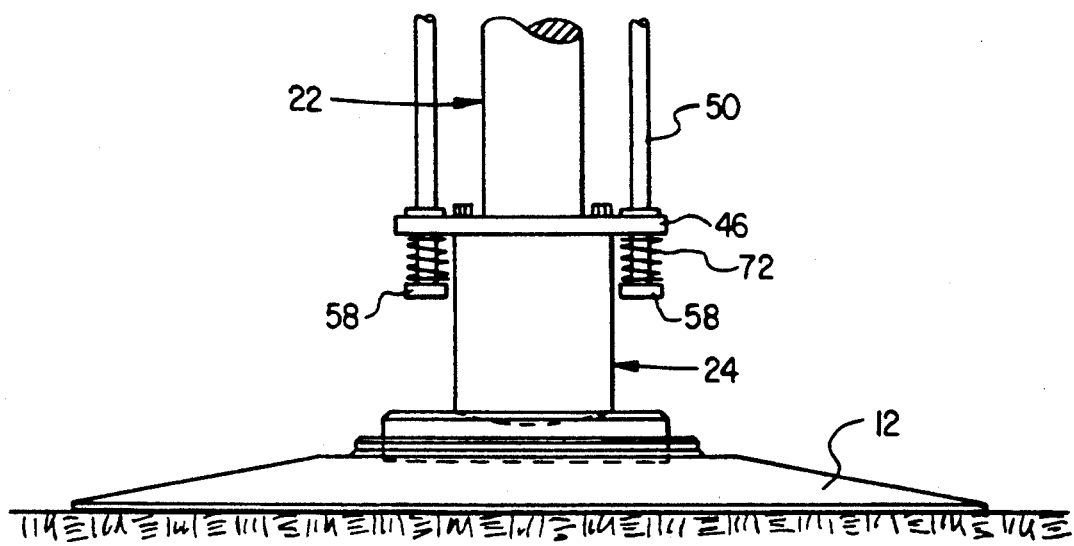

In operation, at some point during the downward travel of impact mass 24, support flange 46 comes into contact with energy storage medium 72 prior to impacting baseplate 12. The characteristics of energy storage medium 72 are selected in accordance with well-known principles in the spring design. These characteristics are selected such that after mass 24 strikes baseplate 12 and gives up its momentum, as shown in FIG. 8(B), energy storage medium 72 will then lift support flange 46 and impact mass 24 because of its stored potential energy. Energy storage medium 72, by acting against lift cap 58, lifts impact mass 24 to an equilibrium position established by the characteristics of energy storage medium 72 some distance above baseplate 12. The lifting of impact mass 24 results in a controlled and repeatable secondary seismic wave which can therefore be filtered from the received seismic signals.

FIG. 9 is a detailed vertical section showing the construction of the energy storage portion of the mass retrieval system in accordance with a fourth useful alternate embodiment of this invention. Rod 68, connected to impact mass 24 through support flange 46 as shown in FIG. 4, is attached energy transmission device 90. Rod 68 passes through energy transmitter 62 and its shaft 92. Shaft 92 passes through energy receiver 66 which has a retainer 94 and which is attached to a horizontally extending frame 14 of transport vehicle (not shown). Pipe 78 connected between orifice 80 of energy receiver 66 and valve 82 allows the desired pressurization or venting of energy storage medium 72 through inlet 84. Inlet 84 may be connected to either a vent or a source of compressed gas (not shown). Controller 86 adjusts the timing and stroke of valve 82 based upon pressure sensed by pressure sensor 96. Other controller inputs which could replace pressure sensor 96 input include the use of a proximity switch, limit switch, or light beam as a means for providing an input signal based on the position of rod 68 during its downward or upward travel. That position information coupled with impact mass velocity and valve 82 operating time can be used to input controller 86 for the timing and stroke of valve 82.

In operation, as impact mass 24, flange 46 and rod 68 move downward, so does energy transmission device 90. At a predetermined impact mass position, energy transmission device 90 comes in contact with energy transmitter 62. Energy storage medium 72 compression between energy transmitter 62 and energy receiver 66 begins. Pressure sensor 96 senses the onset of compression of energy storage medium 72 which sends a signal to controller 86 and causes valve 82 to open and pressurize energy storage medium 72. As mentioned above, the position of rod 68 or energy transmission device 90, support flange 46 or impact mass 24 could be sensed by either a limit switch, proximity switch, or light beam and upon reaching a certain point in the downward direction, that position indicator could provide a signal to controller 86 in lieu of the pressure sensor input, and actuate valve 82 to pressurize the energy storage medium at a predetermined time after sensing the rod position. The advantage of such an arrangement as is shown in FIG. 9 is that the kinetic energy of the impact mass 24 is not reduced because the initial pressure and the energy storage medium 72 is quite low and is maintained that way until impact mass 24 strikes baseplate 12. Rapid pressurization of energy storage medium 72 coupled with the complete loss of kinetic energy by impact mass 24 allows lifting of impact mass 24 off of baseplate 12 in a repeatable way very early in the receive cycle. In this way, any undesired noise caused by the lifting of impact mass 24 off of baseplate 12 can be eliminated during processing of the data.

The energy transfer techniques described and shown are not intended to be all inclusive. For example, within the scope of this invention, one may employ the cushioning effect of air springs in conjunction with hydraulic lift means. In addition, it may be noted that techniques as described herein are applicable within the scope of this invention to the related problem of picking up the baseplate itself when moving the transport vehicle from one location to another. Furthermore, the techniques described herein are applicable within the scope of this invention to the use of an energy transfer device which utilizes the upper end of impact piston 22 and bore 18 as shown in FIG. 1. Any seismic source, whether of the impact or vibratory type which utilizes a heavy mass, particularly in repetitive operations, may face the need to decrease the unwanted secondary shock of suddenly removing the weight of such mass from the earth. As the sophistication of seismic interpretation and analysis increases, the need for minimizing such secondary effects becomes significant. Within the scope of this invention, appropriate energy transfer means may be instituted.

Finally, it should be pointed out that changes may be made in the combination and arrangement as shown in the drawings and set forth in the specification without departing from the spirit and scope of the invention as set forth in the appended claims.

We claim:

1. An impulse-type seismic generating apparatus, comprising:
   (a) a baseplate for coupling elastic energy into the earth as a seismic wave;
   (b) an impact mass comprising an upstanding cylindrical body having a laterally projecting flange;
   (c) latches for suspending said impact mass in a raised position spaced above said base-plate;
   (d) a piston for propelling said mass downwardly from said position of suspension to strike said baseplate, thereby generating said seismic wave;
   (e) a plurality of rods, one end of each of said plurality being affixed to said flange, the other end of each of said plurality of rods capable of being coupled to an energy transmitter;
   (f) a plurality of energy receivers affixed to a horizontal frame of said seismic generating apparatus and adapted to engage said energy transmitters through an energy transfer medium prior to impact of said mass on said baseplate so as to exert a lift force upon said mass.

2. The apparatus of claim 1 wherein said energy storage medium is a fluid.

3. The apparatus of claim 2 wherein said fluid is a gas.

4. The apparatus of claim 3 further including:
   (a) a reservoir;
   (b) a valve in fluid communication with said reservoir; and
   (c) an inlet port in said energy receiver in fluid communication with said valve.

5. The apparatus of claim 4 further including:
   (a) a sensor;
   (b) a controller connected between said sensor and said valve.

6. The apparatus of claim 4 further including:
   (a) a pressure sensor in fluid communication with said energy transfer medium; and
   (b) a controller connected between said pressure sensor and said valve.

7. The apparatus of claim 1 wherein the energy storage medium is a mechanical spring.

8. An impulse type seismic generating apparatus comprising:
   (a) a baseplate for coupling elastic energy into the earth as a seismic wave;
   (b) an impact mass comprising an upstanding cylindrical body having a laterally projecting flange;
   (c) latches for suspending said impact mass in a raised position above said baseplate;
   (d) a piston for propelling said mass downwardly from said position of suspension to strike said baseplate, thereby generating said seismic wave;
   (e) a plurality of rods passing slidably through said laterally projecting flange each having a lift cap;
   (f) an energy storage medium between said laterally projecting flange and said lift cap adapted to engage said laterally projecting flange and said lift cap prior to impact of said impact mass on said baseplate so as to exert a lift force upon said mass prior to impact.

9. The apparatus of claim 8 wherein said energy storage medium is a fluid.

10. The apparatus of claim 9 wherein said fluid is a gas.

11. The apparatus of claim 8 further including:
    (a) a reservoir;
    (b) a valve in fluid communication with said reservoir; and
    (c) an inlet port in said energy receiver in fluid communication with said valve.

12. The apparatus of claim 11 further including:
    (a) a pressure sensor in fluid communication with said energy transfer medium; and
    (b) a controller connected between said pressure sensor and said valve.

13. The apparatus of claim 11 further including:
    (a) a sensor;
    (b) a controller connected between said sensor and said valve.

14. The apparatus of claim 8 wherein the energy storage medium is a mechanical spring.

15. An impulsive seismic energy generating method, comprising:
   (a) impacting a baseplate with an impact mass having a kinetic energy;
   (b) converting a portion of the kinetic energy of said impact mass just prior to impact to potential energy by compressing a fluid;
   (c) raising said impact mass off said baseplate using said stored potential energy.

16. The method of claim 15 wherein said step of converting includes compressing a gas.

17. The method of claim 15 wherein said step of compressing includes controlled pressurization of said fluid.

18. An impulsive seismic energy generating method, comprising:
   (a) providing a signal when an impact mass passes a predetermined position;
   (b) impacting a baseplate with the impact mass having a kinetic energy; and pressuring a compressed fluid upon receiving said signal so as to raise said impact mass off said baseplate using potential energy from the compressed fluid.

19. The method of claim 18 wherein said step of providing includes visually sensing.

20. The method of claim 18 wherein said step of providing includes sensing at a pressure.

* * * * *